United States Patent Office 3,199,369
Patented Aug. 10, 1965

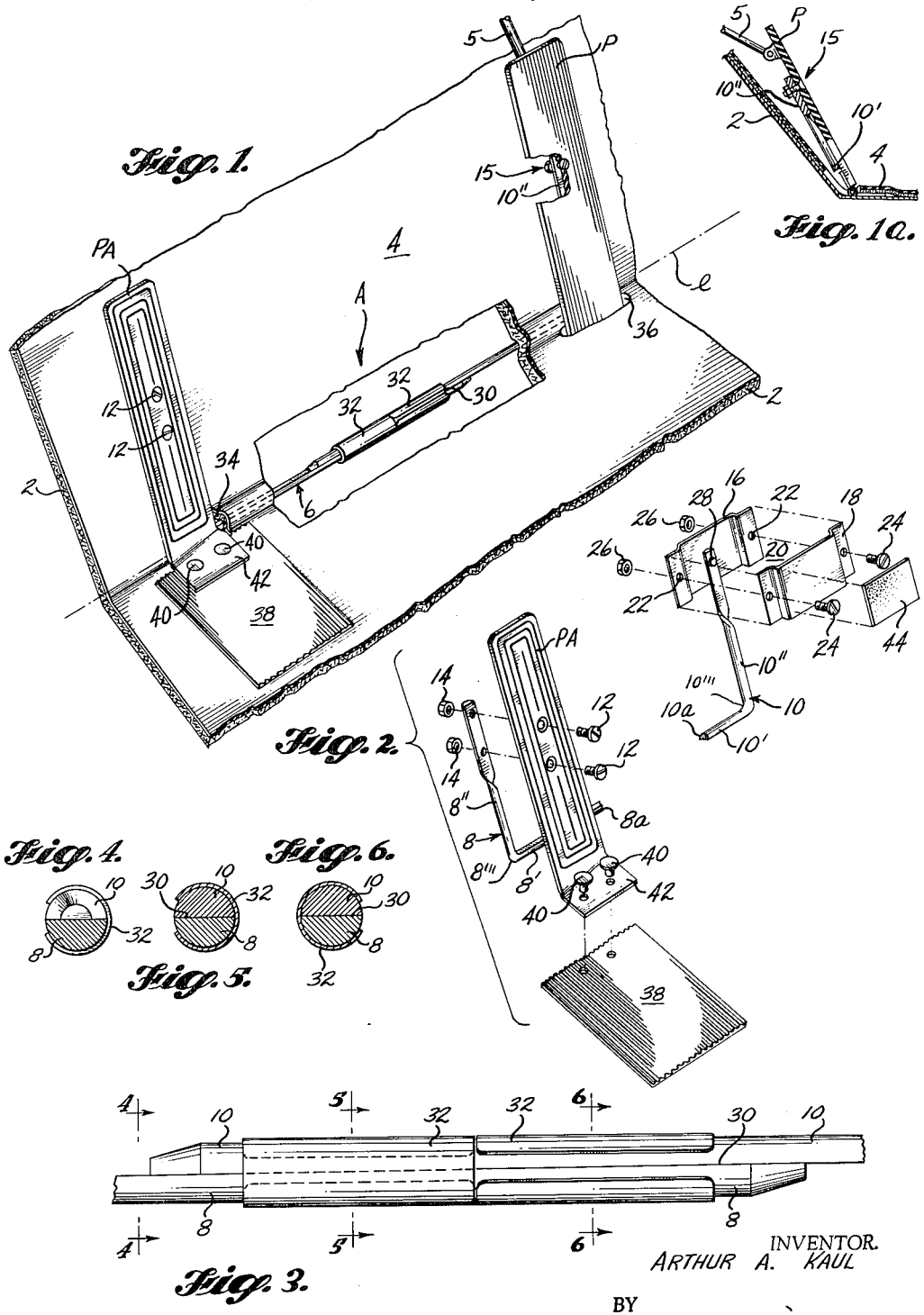

3,199,369
LEFT-FOOT ACCELERATOR PEDAL
Arthur A. Kaul, 961 Chehalis Ave., Chehalis, Wash.
Filed June 14, 1963, Ser. No. 287,951
5 Claims. (Cl. 74—562.5)

This invention relates to auxiliary pedal attachments for the accelerator pedal of an automobile. A principal object of the invention is to provide an auxiliary pedal attachment of this type which consists simply of a foot pedal and a rather abbreviated outrigger arm therefor. Further objects include providing an attachment of this nature in which the outrigger arm is cantilevered from the existing accelerator pedal and because of its abbreviated form, can be easily concealed from view below the floorcovering on the automobile floorboard. They also include providing an attachment of this nature in which the outrigger arm is quickly and easily attached to the existing pedal and is extensible or adjustable to various outlying positions with respect to the existing pedal, so as to satisfy the convenience of all users. It is also an important object that the attachment effect safe reliable positive actuation of the accelerator pedal in all outlying positions of the arm.

According to the invention, these and other objects are realized with an auxiliary pedal attachment of my conception which comprises a U-shaped outrigger arm that is formed from a pair of angle bars joined together by a clamp. The auxiliary pedal is secured on the upwardly extending leg of one bar and the corresponding leg of the other bar is used to mount the attachment on the existing pedal. The joint between the bars allows for limited movement between the two for purposes of adjusting the outlying position of the auxiliary pedal. The joint is also compact and held by small-sized means so that the transversely-extending legs of the bar assembly, including the joint, can be concealed below the floorboard covering of the automobile.

The invention will be better understood by reference to the accompanying drawing wherein FIGURE 1 is a perspective view of the inventive attachment as constructed and mounted under the floorboard covering with a portion of such covering removed to show its mounting;

FIGURE 1A is a part-sectional view through the accelerator pedal, the attachment being mounted above the covering in this instance;

FIGURE 2 is an exploded view of the attachment as equipped with a modified form of pedal clamp;

FIGURE 3 is a plan view of the clamping arrangement used in the attachment itself; and FIGURES 4–6 are cross-sectional views of this clamping arrangement as taken along lines 4—4, 5—5, and 6—6 of FIGURE 3, respectively.

A portion 2 of the floorboard of an automobile is seen in FIGURE 1, there being a rubberized or other floor covering 4 laid thereover. The portion represents that found at the driver's feet and an accelerator pedal is available for control of the automobile, as indicated at P, there also being means 5 partially shown whereby the pedal is pivotally or otherwise mounted for actuation by the driver's right foot. For the driver's further comfort and convenience, the floorboard is also canted up behind the pedal and the pedal is positioned upright at the base of the cant.

The auxiliary pedal attachment of the invention is indicated generally at A. It comprises a foot pedal Pa and an arm 6 which serves as an outrigger for the pedal Pa. The arm 6 is formed from a pair of right angle bars 8 and 10 which are clamped together in a U-shaped assembly. The bars have transversely-extending leg portions 8' and 10', and upwardly-extending leg portions 8" and 10", which meet and terminate in bights 8''' and 10''', respectively. The pedal Pa is secured on the leg portion 8" of the bar 8 by means of a pair of bolts 12 passed through drilled holes in both elements and drawn up tightly against the same by nuts 14 threaded onto the bolts.

The arm 6 is cantilevered from the pedal P by means of a nut and bolt connection 15 made through drilled holes in the pedal P and the leg portion 10" of the arm. The arm can be cantilevered from the pedal P so as to extend above the floorcovering 4, if desired, simply by adjustment of the level at which the connection 15 is made on the pedal P and/or the leg portion 10". See FIGURE 1A.

Alternatively, the arm 6 can be cantilevered from the pedal P by means of a releasable clamp in the form of a pair of channels 16 and 18 which are similarly sized and flanged so that when oppositely disposed they form a narrow slot or jaw 20 which is adapted to receive the pedal P. See FIGURE 2. The channel flanges are equipped with opposing holes 22 to receive bolts 24 by which the channels are drawn together into clamping engagement about the pedal, the act of such being accomplished with nuts 26 threaded onto the bolts 24. The arm 6 is attached to the clamp for cantilevering from the pedal, by welding, riveting, bolting or otherwise securing the leg portion 10" to the inner face of the channel 16, as seen at 28. One of the channels can or may be replaced by a flat plate having suitable holes 22.

It will be noted that the bars 8 and 10 have part-cylindrical cross-sections and that these cross-sections are complemental to one another (FIGURES 4–6) so that the end portions 8a and 10a of the leg portions 8' and 10' will form an elongated cylindrical joint 30 when laid face to face in parallel overlapping relationship. The joint is secured by means of a pair of thin elongated C-clamps 32 which are tightly clasped about the joint so as to restrain the end portions 8a and 10a against separation in directions transverse the longitudinal axis 1 of the joint.

It will be appreciated that the C-clamps also serve to restrain the end portions against separation in directions parallel to such axis but that under the application of force, a limited amount of movement between the bars is possible along the axis. Accordingly, at the time of installation or at any later time, where necessary, it is possible to adjust the outlying position of the pedal Pa with respect to pedal P by giving the bar 8 a blow, such as with a hammer, which is directed along or parallel to the axis 1.

The attachment A is mounted below the floorcovering, as in FIGURE 1, by making an additional hole 34 in the floorcovering to correspond with the outlying position of the pedal Pa; and slipping the leg portions 8" and 10" of the arm 6 up through this and the existing hole 36 in the covering, the leg portion 10" being passed up through the hole 36 to extend behind and generally parallel to the pedal P. The pedal Pa may be secured on the leg portion 8" thereafter, if it had been removed for the mounting operation. Since the leg portions 8" and 10" are concealed behind their respective pedals, and the leg portions 8' and 10' lie below the covering 4, the arm 6 is in effect entirely concealed from view.

An optional foot rest pad 38 is appended to the pedal Pa by means of rivets 40 passed through a lip 42 formed on the lower end thereof. A rough-surfaced, rubberized face plate 44 is also glued to the channel 18 for purposes of giving the drivers' right foot more traction on the pedal P.

To allow for a slight degree of bending that will occur in the arm 6, with respect to the pedal P, the pedal Pa is inclined at a slightly greater cant than the pedal P.

It is to be understood, of course, that while the invention has been illustrated by particular forms thereof, certain additions and modifications can be made to and in these forms without departing from the spirit and scope of the invention as defined in the claims following:

I claim as my invention:

1. An auxiliary pedal attachment for use with an automobile accelerator pedal, comprising a pair of right angle bars each having a pair of legs meeting and terminating in a right angular bight, said bars being arranged together in a U-shaped configuration forming an adjustable outrigger arm assembly for the attachment, the end portions of the transversely extending legs of the bars in the assembly being complementally part cylindrical in cross section and arranged face to face with one another in overlapping relationship so that they form an elongated cylindrical joint, a thin elongated C-clamp tightly clasped about the joint so as to restrain the bars against lateral separation while allowing for limited relative lengthwise movement between the bars under the application of force longitudinally of the joint, for purposes of adjusting the spacing between the upwardly extending legs of the same, releasable clamp means connected with the upwardly extending leg of one bar, for releasably securing the latter leg to the back of the accelerator pedal so that the attachment is cantilevered therefrom, and a foot pedal attached to the upwardly extending leg of the other bar to enable actuation of the accelerator pedal from the outlying position of said other bar.

2. An auxiliary pedal attachment according to claim 1 wherein the releasable clamp means includes a pair of opposing channels one of which is secured to the upwardly-extending leg of the one bar, said channels defining a jaw therebetween for receiving an accelerator pedal, and having fastener means thereon which operate releasably to clamp the channels about such pedal.

3. In combination with an automobile accelerator pedal mounted in the automobile floorboard, an auxiliary pedal attachment which comprises a pair of right angle bars that are arranged together in a generally U-shaped outrigger arm assembly with each bar having a transversely extending leg and an upwardly extending leg, the end portions of the transversely extending legs of the bars being complementally part-cylindrical in cross section and arranged face to face with one another in parallel overlapping relationship so that they form an elongated cylindrical joint, a thin elongated C-clamp tightly clasped about the joint so as to restrain the bars against lateral separation while allowing for limited relative lengthwise movement between the bars under the application of force longitudinally of the joint, the upwardly extending leg of one bar being concealed behind and generally parallel to the accelerator pedal, and the remainder of the arm assembly projecting leftwardly of the pedal, from the driver's point of view, releasable clamp means securing said upwardly extending leg of the one bar to the back of the accelerator pedal, so that the attachment is cantilevered therefrom, and a foot pedal attached to the upwardly extending leg of the other bar to enable actuation of the accelerator pedal from the outlying position of said other bar.

4. The combination according to claim 3, wherein the releasable clamp means includes a pair of opposing channels one of which is secured to the upwardly extending leg portion of the one bar, said channels defining a jaw therebetween in which the accelerator pedal is received and having fastener means thereon which operate releasably to clamp the channels about such pedal.

5. In combination with an automobile accelerator pedal mounted in the covered floorboard of the automobile, an auxiliary pedal attachment which comprises a pair of right angle bars each having a pair of legs meeting and terminating in a right angular bight, said bars being arranged together in a U-shaped configuration forming an adjustable outrigger arm assembly for the attachment, the end portions of the transversely extending legs of the bars in the assembly being complementally part-cylindrical in cross section and arranged face to face with one another in overlapping relationship so that they form an elongated cylindrical joint, a thin elongated C-clamp tightly clasped about the joint so as to restrain the bars against lateral separation while allowing for limited relative lengthwise movement between the bars under the application of force longitudinally of the joint, for purposes of adjusting the spacing between the upwardly extending legs of the same, the floorboard covering having a hole therein at a point spaced to the left of the hole for the accelerator pedal, from the driver's point of view, and the outrigger arm assembly being disposed adjacent the floorboard with the transversely extending legs of the bars and the clamped joint therebetween, concealed between the floorboard and its covering, the bights of the bars substantially in the holes in the covering, and the upwardly extending legs of the bars projecting upwardly from the holes at a cant with the floorboard, the right hand of which projecting legs is concealed between the floorboard covering and the pedal, from the driver's point of view, and releasably secured to the back of the pedal so that the attachment is cantilevered therefrom, and a foot pedal attached to the left hand of the projecting legs to enable actuation of the accelerator pedal from the outlying position of said left hand projecting leg.

References Cited by the Examiner

UNITED STATES PATENTS

| | | | |
|---|---|---|---|
| 624,644 | 5/99 | Girardeau et al. | 74—543 X |
| 2,187,068 | 1/40 | Adamic | 74—562.5 |
| 2,591,523 | 4/52 | Dick. | |
| 2,645,948 | 7/53 | Beckman | 74—562.5 |
| 2,658,411 | 11/53 | Eversman | 74—562.5 |
| 2,735,312 | 2/56 | Howard | 74—562.5 |
| 2,829,539 | 4/58 | Wilcox | 74—562.5 |

BROUGHTON G. DURHAM, *Primary Examiner.*

MILTON KAUFMAN, *Examiner.*

UNITED STATES PATENT OFFICE
CERTIFICATE OF CORRECTION

Patent No. 3,199,369                  August 10, 1965

Arthur A. Kaul

It is hereby certified that error appears in the above numbered patent requiring correction and that the said Letters Patent should read as corrected below.

Column 4, line 6, strike out "portion"; line 7, after "received" insert a comma.

Signed and sealed this 8th day of February 1966.

(SEAL)
Attest:

ERNEST W. SWIDER                  EDWARD J. BRENNER
Attesting Officer                    Commissioner of Patents